United States Patent
Lee et al.

(10) Patent No.: US 12,068,482 B2
(45) Date of Patent: Aug. 20, 2024

(54) ELECTRODE AND ELECTRODE ASSEMBLY

(71) Applicant: LG Chem, Ltd., Seoul (KR)

(72) Inventors: Ji Su Lee, Daejeon (KR); Bum Young Jung, Daejeon (KR); Jun Soo Park, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 910 days.

(21) Appl. No.: 16/978,059

(22) PCT Filed: Dec. 13, 2019

(86) PCT No.: PCT/KR2019/017712
§ 371 (c)(1),
(2) Date: Sep. 3, 2020

(87) PCT Pub. No.: WO2020/153604
PCT Pub. Date: Jul. 30, 2020

(65) Prior Publication Data
US 2020/0411865 A1    Dec. 31, 2020

(30) Foreign Application Priority Data
Jan. 21, 2019    (KR) .......................... 10-2019-0007597

(51) Int. Cl.
*H01M 4/62* (2006.01)
*H01M 4/02* (2006.01)
(Continued)

(52) U.S. Cl.
CPC .......... *H01M 4/62* (2013.01); *H01M 10/052* (2013.01); *H01M 10/4235* (2013.01);
(Continued)

(58) Field of Classification Search
None
See application file for complete search history.

(56) References Cited

U.S. PATENT DOCUMENTS

2003/0099880 A1    5/2003  Park et al.
2003/0148174 A1*   8/2003  Gu ...................... H01M 50/193
                                                            429/129
(Continued)

FOREIGN PATENT DOCUMENTS

JP    2004241170 A        8/2004
JP    2009054484 A  *     3/2009
(Continued)

OTHER PUBLICATIONS

Machine translation of KR 2016-0133771 A (Year: 2016).*
International Search Report for PCT/KR2019/017712 mailed Mar. 20, 2020; 2 pages.

*Primary Examiner* — Robert S Carrico
(74) *Attorney, Agent, or Firm* — Lerner David LLP (57) ABSTRACT

An electrode includes: an active material coating portion coated with an electrode active material on at least one surface of an electrode collector; an active material non-coating portion which is formed on one side of the active material coating portion and is not coated with the electrode active material; and an electrode coating portion which is coated between the active material coating portion and the active material non-coating portion and contains a flame retardant.

20 Claims, 8 Drawing Sheets

(51) Int. Cl.
 *H01M 10/052* (2010.01)
 *H01M 10/42* (2006.01)
 *H01M 50/105* (2021.01)
 *H01M 50/178* (2021.01)
 *H01M 50/534* (2021.01)

(52) U.S. Cl.
 CPC ....... *H01M 50/105* (2021.01); *H01M 50/178* (2021.01); *H01M 2004/028* (2013.01); *H01M 50/534* (2021.01)

(56) References Cited

U.S. PATENT DOCUMENTS

| | | |
|---|---|---|
| 2010/0209782 A1 | 8/2010 | Choi et al. |
| 2013/0071696 A1 | 3/2013 | Kim et al. |
| 2015/0318580 A1 | 11/2015 | Fukunaga et al. |

FOREIGN PATENT DOCUMENTS

| | | | |
|---|---|---|---|
| JP | 4698929 B2 | | 6/2011 |
| JP | 2014226634 A | | 12/2014 |
| JP | 2016034624 A | | 3/2016 |
| KR | 20030042578 A | | 6/2003 |
| KR | 20060034181 A | | 4/2006 |
| KR | 20090017706 A | | 2/2009 |
| KR | 100956397 B1 | | 5/2010 |
| KR | 20100093986 A | | 8/2010 |
| KR | 20100094330 A | | 8/2010 |
| KR | 20130064031 A | * | 6/2013 |
| KR | 20130064031 A | | 6/2013 |
| KR | 20150014263 A | | 2/2015 |
| KR | 20150094698 A | | 8/2015 |
| KR | 101595607 B1 | | 2/2016 |
| KR | 20160133771 A | * | 11/2016 |
| KR | 20160133771 A | | 11/2016 |
| KR | 20170038405 A | | 4/2017 |
| KR | 20180043232 A | | 4/2018 |
| WO | 2018168607 A1 | | 9/2018 |

* cited by examiner

ELECTRODE AND ELECTRODE ASSEMBLY

CROSS-REFERENCE TO RELATED APPLICATION

The present application is a national phase entry under 35 U.S.C. § 371 of International Application No. PCT/KR2019/017712, filed Dec. 13, 2019, published in Korean, which claims the benefit of the priority of Korean Patent Application No. 10-2019-0007597, filed on Jan. 21, 2019, which are hereby incorporated by reference in their entireties.

TECHNICAL FIELD

The present invention relates to an electrode and an electrode assembly, and more particularly, to an electrode in which initial heat generation is suppressed through heat absorption reaction of a flame retardant when an abnormal operation such as internal short circuit, external short circuit, overcharge, overdischarge, and the like occurs, thereby securing safety, and an electrode assembly.

BACKGROUND ART

In general, secondary batteries include nickel-cadmium batteries, nickel-hydrogen batteries, lithium ion batteries, and lithium ion polymer batteries. Such a secondary battery is being applied to and used in small-sized products such as digital cameras, P-DVDs, MP3Ps, mobile phones, PDAs, portable game devices, power tools, E-bikes, and the like as well as large-sized products requiring high power such as electric vehicles and hybrid vehicles, power storage devices for storing surplus power or renewable energy, and backup power storage devices.

In order to manufacture an electrode assembly, a cathode, a separator, and an anode are manufactured and stacked. Specifically, cathode active material slurry is applied to a cathode collector, and anode active material slurry is applied to an anode collector to manufacture a cathode and an anode. Also, when the separator is interposed and stacked between the manufactured cathode and anode, unit cells are formed. The unit cells are stacked on each other to form an electrode assembly. Also, when the electrode assembly is accommodated in a specific case, and an electrolyte is injected, the secondary battery is manufactured.

However, in the related art, when an abnormal operation such as exposure of the secondary battery at a high temperature, internal/external short circuit, overcharging, or overdischarging occurs, the separator is contracted due to generated heat, and thus, the cathode and the anode directly contact each other to increase in possibility of occurrence of the short circuit. Also, the short circuit may occur due to the contact between the cathode and the anode due to poor battery production. Due to the short circuit, rapid electron transfer may occur inside the battery, and thus, when the heat generation and side reactions occur, the secondary battery may be exploded to cause a safety problem. In particular, when an electrical malfunction occurs, such as the overcharge, the overdischarge, or the external short circuit, since high current flows, and the thermal conductivity of the collector is low, the temperature of the collector is higher than that of the active material layer. Thereafter, the heat may be diffused, and thus, thermal, chemical, and electrochemical reactions of components such as the active materials and the electrolytes may be added to lead to thermal runaway.

DISCLOSURE OF THE INVENTION

Technical Problem

An object of the prevent invention is to provide an electrode in which short circuit due to contact between a cathode and an anode, which may occur when a battery is manufactured, is prevented when an abnormal operation such as internal short circuit, external short circuit, overcharge, overdischarge, and the like occurs, and simultaneously, initial heat generation is suppressed through heat absorption reaction of a flame retardant to secure safety, and an electrode assembly.

The objects of the present invention are not limited to the aforementioned object, but other objects not described herein will be clearly understood by those skilled in the art from descriptions below.

Technical Solution

An electrode according to an embodiment of the present invention for solving the above problem includes: an active material coating portion coated with an electrode active material on at least one surface of an electrode collector; an active material non-coating portion which is formed on one side of the active material coating portion and is not coated with the electrode active material; and an electrode coating portion which is coated between the active material coating portion and the active material non-coating portion and contains a flame retardant.

Also, the electrode collector may be a cathode collector, and the electrode active material may be a cathode active material.

Also, the flame retardant may include halogen-based flame retardants, phosphorus-based flame retardants, or inorganic compound flame retardants.

Also, the flame retardant may include aluminum hydroxide ($Al(OH)_3$), magnesium hydroxide ($Mg(OH)_2$), or boric acid ($BH_3O_3$).

Also, the electrode coating portion may include an interface between the active material coating portion and the active material non-coating portion.

Also, the active material coating portion and the active material non-coating portion may be formed on a same surface of the electrode collector.

An electrode assembly according to an embodiment of the present invention for solving the above problem includes: a cathode including a cathode active material coating portion coated with a cathode active material on at least one surface of a cathode collector, a cathode active material non-coating portion which is formed on one side of the cathode active material coating portion and is not coated with the cathode active material, and a cathode coating portion which is coated between the cathode active material coating portion and the cathode active material non-coating portion and contains a flame retardant; an anode including an anode active material coating portion coated with an anode active material on at least one surface of an anode collector, an anode active material non-coating portion which is formed on one side of the anode active material coating portion and is not coated with the anode active material; and a separator disposed between the cathode and the anode.

Also, the anode may further include an anode coating portion which is coated between the anode active material coating portion and the anode active material non-coating portion and contains a flame retardant.

The present invention also provide a secondary battery including the electrode assembly.

Also, the secondary battery may further include: a plurality of electrode tabs respectively protruding from the cathode and the anode; a plurality of electrode leads respectively connected to the plurality of electrode tabs to transfer electricity generated in the electrode assembly to the outside; a battery case configured to accommodate the electrode assembly therein; and an insulation part configured to surround the plurality of electrode leads, sealed with the battery case, and containing a flame retardant.

Particularities of other embodiments are included in the detailed description and drawings.

Advantageous Effects

The embodiments of the present invention may have at least the following effects.

Since the non-conductive coating portion containing the flame retardant is coated between the active material coating portion and the active material non-coating portion, the short circuit between the cathode and the anode by the damage, the folding, and the like of the separator due to the defects and the abnormal operation of the battery when the battery is produced may be prevented.

In addition, when the battery abnormally operates, the flame retardant may suppress the initial heat generation to secure the safety.

The effects of the prevent invention are not limited by the aforementioned description, and thus, more varied effects are involved in this specification.

MODE FOR CARRYING OUT THE INVENTION

Advantages and features of the present invention, and implementation methods thereof will be clarified through following embodiments described with reference to the accompanying drawings. The present invention may, however be embodied in different forms and should not be construed as limited to the embodiments set forth herein. Rather, these embodiments are provided so that this disclosure will be thorough and complete, and will fully convey the scope of the present invention to those skilled in the art. Further, the present invention is only defined by scopes of claims. Like reference numerals refer to like elements throughout.

Unless terms used in the present invention are defined differently, all terms (including technical and scientific terms) used herein have the same meaning as generally understood by those skilled in the art. Also, unless defined clearly and apparently in the description, the terms as defined in a commonly used dictionary are not ideally or excessively construed as having formal meaning.

In the following description, the technical terms are used only for explaining a specific exemplary embodiment while not limiting the present invention. In this specification, the terms of a singular form may include plural forms unless specifically mentioned. The meaning of "comprises" and/or "including" does not exclude other components besides a mentioned component.

Hereinafter, preferred embodiments will be described in detail with reference to the accompanying drawings.

Figure 1:
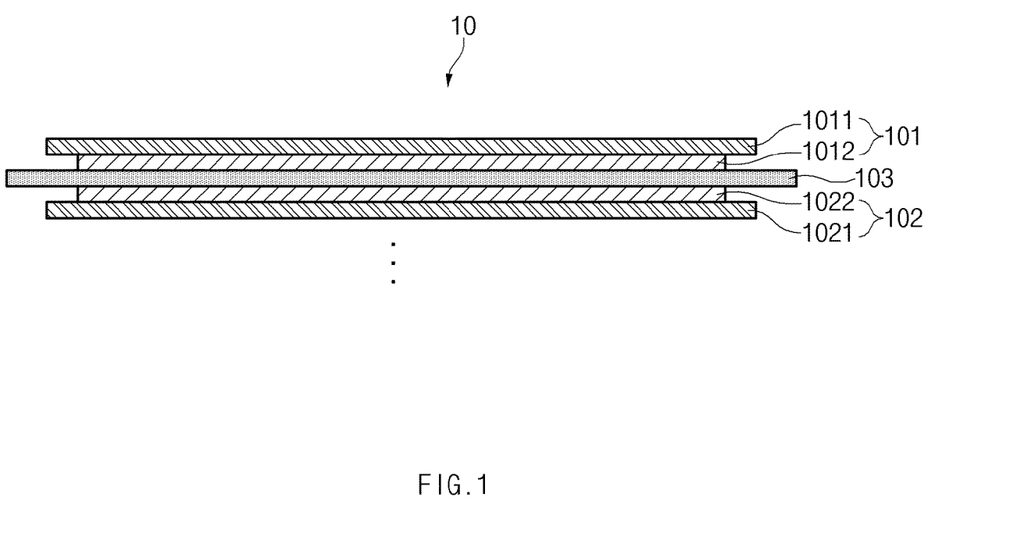
FIG. 1 is a schematic view of an electrode assembly according to an embodiment of the present invention.

FIG. 1 is a schematic view of an electrode assembly 10 according to an embodiment of the present invention.

In a process of manufacturing the electrode assembly 10 according to an embodiment of the present invention, as described above, first, slurry in which a cathode active material 1012, a binder, and a plasticizer are mixed is applied to a cathode collector 1011, and slurry in which an anode active material 1022, the binder, and the plasticizer are mixed is applied to an anode collector 1021 to manufacture a cathode 101 and an anode 102. Also, when a separator 103 is disposed between the manufactured cathode 101 and the manufactured anode 102 so as to be stacked, unit cells are formed. Then, the unit cells are stacked on each other to form the electrode assembly 10 having a predetermined shape as illustrated in FIG. 1.

The cathode 101 and the anode 102, which are used in the present invention, are not particularly limited to both electrodes 101 and 102 and thus may be manufactured in a shape in which the electrode active materials 1012 and 1022 are bonded to the electrode collectors 1011 and 1021 according to the conventional method known in the art. Here, the cathode 101 may be manufactured by, for example, applying the slurry, in which the cathode active material 1012, the conductive agent, and the binder are mixed, onto a cathode collector 1011, and then drying and pressing the slurry. At this time, if necessary, the slurry may further include a filler. The cathode 101 may be manufactured in a sheet shape and mounted on a roll.

The cathode collector 1011 generally has a thickness of 3 μm to 500 μm. The cathode collector 1011 is usually made of a material having high conductivity without causing a chemical change. Such a material may be surface-treated with, for example, stainless steel, aluminum, nickel, titanium, calcined carbon, or aluminum or stainless steel on which carbon, nickel, titanium, silver, or the like is surface-treated on a surface thereof, but is not limited thereto. In addition, the cathode collector 1011 may form a fine unevenness on a surface of the cathode collector 1012 to increase in adhesion of the cathode active material 1012. Also, the cathode collector 1011 may have various shapes such as a film, a sheet, a foil, a net, a porous body, a foam, or a non-woven fabric.

In case of a lithium secondary battery, the cathode active material 1012 includes, for example, a layered compound of lithium cobalt oxides ($LiCoO_2$), lithium nickel oxides ($LiNiO_2$), etc., or a compound substituted with one or more transition metals; lithium manganese oxides such as oxides represented by Chemical Formula of $Li_{1+x}Mn_{2-x}O_4$ (in which x is 0 to 0.33), $LiMnO_3$, $LiMn_2O_3$, $LiMnO_2$, etc.; lithium copper oxides ($Li_2CuO_2$); vanadium oxides such as $LiV_3O_8$, $LiFe_3O_4$, $V_2O_5$, $Cu_2V_2O_7$, etc.; Ni site-type lithium nickel oxides represented by Chemical Formula of $LiNi_{1-x}M_xO_2$ (in which M=Co, Mn, Al, Cu, Fe, Mg, B or Ga, x=0.01 to 0.3); lithium manganese complex oxides represented by Chemical Formula of $LiMn_{2-x}M_xO_2$ (in which M=Co, Ni, Fe, Cr, Zn or Ta, and x=0.01 to 0.1) or $Li_2Mn_3MO_8$ (in which, M=Fe, Co, Ni, Cu or Zn); 3-component lithium oxides represented by Chemical Formula of Li $[Ni_{1-x-y}Co_xM_y]O_2$ (M=Mn or Al, and x, y=0 to 1); 4-component lithium oxides represented by Chemical Formula of Li $[Ni_{1-x-y}Co_xMn_yAl_z]O2$ (x, y, z=0 to 1); $LiMn_2O_4$ in which a portion of Li in Chemical Formula is substituted with alkaline earth metal ions; disulfide compounds; $Fe_2(MoO_4)_3$, and the like. However, this embodiment is not limited thereto.

The conductive agent is generally added at 1% to about 50% by weight based on the total weight of the mixture including the cathode active material 1012. The conductive agent is usually made of a material having conductivity without causing a chemical change. The conductive agent may include, for example, conductive materials such as: graphite such as natural graphite and artificial graphite; carbon black such as acetylene black, Ketjen black, channel black, furnace black, lamp black, and thermal black; conductive fiber such as carbon fiber and metal fiber; metal powder such as carbon fluorine, aluminum, and nickel powder; conductive whisker such as zinc oxide and potassium titanate; conductive oxide such as titanium oxide; or polyphenylene derivatives.

The binder is a component assisting the bonding of the active material to the conductive material and the bonding to the collector and is commonly added at 1 wt % to 50 wt % based on the total weight of the mixture including the cathode active material 1012. Examples of the binder may include polyfluoro vinylidene, polyvinyl alcohol, carboxymethyl cellulose (CMC), starch, hydroxypropyl cellulose, regenerated cellulose, polyvinyl pyrrolidone, tetrafluoroethylene, polyethylene, polypropylene, ethylene-propylene-diene polymer (EPDM), sulfonated EPDM, styrene butadiene rubber, fluorine rubber, various copolymers, and the like.

The filler is optionally used as a component that inhibits expansion of the cathode 101. And, a general filler may be used if the filler is a fibrous material without causing the chemical change. Examples of the filler may include olefin polymers such as polyethylene and polypropylene; and fibrous materials such as glass fibers and carbon fibers.

The anode 102 may be manufactured by, for example, applying the anode active material 1022 on the anode collector 1021 and then drying and pressing the anode active material 1022. If necessary, the anode active material 1022 may optionally include a conductive agent, a binder, a filler, and the like. The anode 102 may be manufactured in a sheet shape and mounted on a roll.

The anode collector 1021 generally has a thickness of 3 µm to 500 µm. The anode collector 1021 is usually made of a material having conductivity without causing a chemical change. Examples of the material include copper, stainless steel, aluminum, nickel, titanium, calcined carbon, copper or stainless steel on which carbon, nickel, titanium, silver, or the like is surface-treated on a surface thereof, or aluminum-cadmium alloys. In addition, the anode collector 1021 may form fine unevenness on the surface of the anode collector 1021 to increase in bonding force of the anode active material 1022. Also, the anode collector 1021 may have various shapes such as a film, a sheet, a foil, a net, a porous body, a foam, or a non-woven fabric.

The anode active material 1022 may include, for example, carbon such as non-graphitizable carbon, graphite-based carbon, etc.; metal complex oxides such as $Li_xFe_2O_3$ (0≤x≤1), $Li_xWO_2$ (0≤x≤1), $Sn_xMe_{1-x}Me'_yO_z$ (Me: Mn, Fe, Pb, Ge; Me': Al, B, P, Si, elements included in the Group 1, Group 2 and Group 3 in the periodic table, halogen, where 0<x≤1; 1≤y≤3; 1≤z≤8), etc.; lithium metals; lithium alloys; silicon-based alloys; titanium compounds such as $Li_4Ti_5O_2$; tin-based alloys; metal oxides such as $MnO_x$, $FeO_x$, $CoO_x$, $NiO_x$, $CuO_x$, SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, and $Bi_2O_5$; conductive polymers such as polyacetylene, etc.; Li—Co—Ni-based material, and the like.

Generally known polyolefin separators or a composite separators in which an organic or inorganic composite layer is formed on an olefin base material may be used as the separator that insulates the electrodes 101 and 102 between the cathode 101 and the anode 102, but is not particularly limited thereto.

Figure 2:
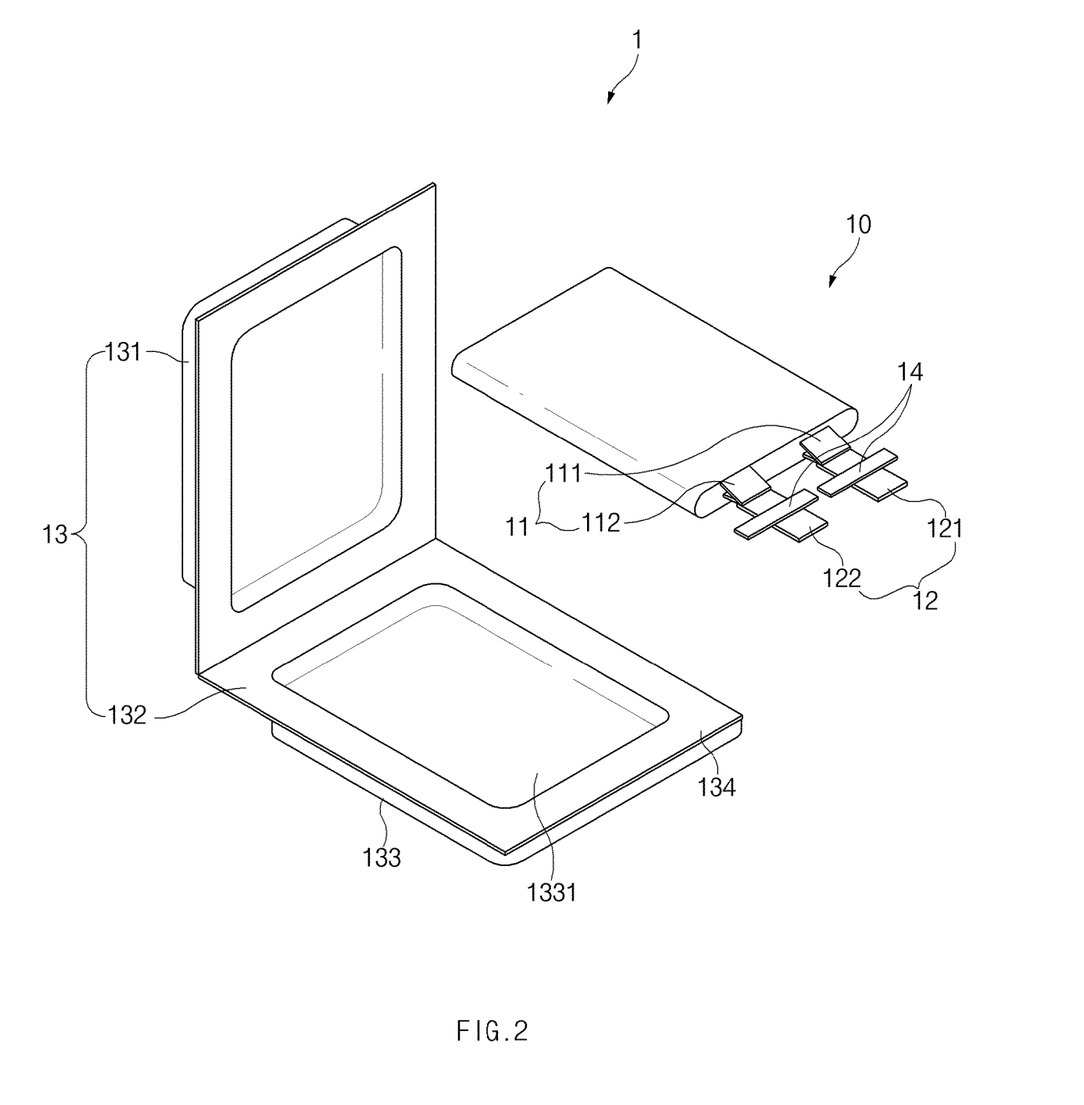
FIG. 2 is an assembly view of a pouch type secondary battery according to an embodiment of the present invention.

According to an embodiment of the present invention, the electrode assembly 10 having the above structure is accommodated in the battery case 13, and then, the electrolyte is injected to manufacture the secondary battery 1.

FIG. 2 is an assembly view of the pouch type secondary battery 1 according to an embodiment of the present invention.

The pouch-type secondary battery 1 according to an embodiment of the present invention may further include: a plurality of electrode tabs 11 respectively protruding to sides from the cathode 101 and the anode 102 as well as the electrode assembly 10; a plurality of electrode leads 12 respectively connected to the electrode tabs 11 to transfer electricity generated in the electrode assembly 10 to the outside; a battery case 13 accommodating the electrode assembly 10 therein; and an insulation part 14 surrounding the electrode leads 12, sealed with the battery case 13, and containing the flame retardant.

In the process of manufacturing the secondary battery 1, as described above, after forming the electrode assembly 10, the electrode assembly 10 is inserted into the battery case 13 and sealed after injection of the electrolyte.

As illustrated in FIG. 2, the electrode assembly 10 includes the electrode tabs 11. The electrode tabs 11 are respectively connected to the cathode 101 and the anode 102 of the electrode assembly 10 to protrude to the outside of the electrode assembly 10, thereby providing a path, through which electrons move, between the inside and outside of the electrode assembly 10. The electrode collectors 1011 and 1021 of the electrode assembly 10 may include active material coting portions 1013 and 1023 coated with the electrode active materials 1012 and 1022 and active material non-coating portions 1014 and 1024 which are not coated with the electrode active materials 1012 and 1022. The electrode tab 11 may be formed by cutting the active material non-coating portions 1014 and 1024 or may be formed by connecting a separate conductive member to the active material non-coating portions 1014 and 1024 by ultrasonic welding. As illustrated in FIG. 2, the electrode tabs 11 may protrude from one side of the electrode assembly 10 in the same direction, but the present invention is not limited thereto. For example, the electrode tabs 11 may protrude in directions different from each other.

In the electrode assembly 10, the electrode lead 12 is connected to the electrode tab 11 through spot welding.

Also, a portion of the electrode lead 12 is surrounded by an insulation part 14. The insulation part 14 may be disposed to be limited within a sealing part 134, at which an upper case 131 and a lower case 132 of the battery case 13 are thermally fused, so that the electrode lead 12 is bonded to the battery case 13. Also, electricity generated from the electrode assembly 10 may be prevented from flowing to the battery case 13 through the electrode lead 12, and the sealing of the battery case 13 may be maintained. Thus, the insulation part 14 may be made of a nonconductor having non-conductivity, which is not electrically conductive. In general, although an insulation tape which is easily attached to the electrode lead 12 and has a relatively thin thickness is mainly used as the insulation part 14, the present invention is not limited thereto. For example, various members may be used as the insulation part 14 as long as the members are capable of insulating the electrode lead 12.

Furthermore, the flame retardant may be further provided in the insulation part 14 according to an embodiment of the present invention. Therefore, the cells may be protected from the cause of ignition such as external fire, flame, spark, etc. to improve heat resistance stability of the secondary battery 1. The flame retardant is a material that inhibits combustion reaction and may include various flame retardants such as halogen-based flame retardants, phosphorus-based flame retardants, or inorganic compound flame retardants. This will be described below in detail.

The electrode leads 12 may extend in the same direction or extend in directions different from each other according to the formation positions of the cathode tab 111 and the anode tab 112. The cathode lead 121 and the anode lead 122 may be made of materials different from each other. That is, the cathode lead 121 may be made of the same material as the cathode collector 1011, i.e., an aluminum (Al) material, and the anode lead 122 may be made of the same material as the anode collector 1021, i.e., a copper (Cu) material or a copper material coated with nickel (Ni). Also, a portion of the electrode lead 12, which protrudes to the outside of the battery case 13, may be provided as a terminal part and electrically connected to an external terminal.

In the pouch type secondary battery 1 according to an embodiment of the present invention, the battery case 13 may be a pouch made of a flexible material. Hereinafter, the case in which the battery case 13 is the pouch will be described. The battery case 13 accommodates the electrode assembly 10 so that a portion of the electrode lead 12, i.e., the terminal part is exposed and then is sealed. As illustrated in FIG. 2, the battery case 13 includes the upper case 131 and the lower case 132. A cup part 133 having an accommodation space 1331 accommodating the electrode assembly 10 is formed in the lower case 132, and the upper case 131 covers an upper portion of the accommodation space 1331 to prevent the electrode assembly 10 from being separated to the outside of the battery case 13. Here, as illustrated in FIG. 2, the cup part 133 having the accommodation part 1331 may be formed in the upper case 131 to accommodate the electrode assembly 10 in the upper portion. As illustrated in FIG. 2, one side of the upper case 131 and one side of the lower case 132 may be connected to each other. However, the present invention is not limited thereto. For example, the upper case 131 and the lower case 132 may be separately manufactured to be separated from each other.

When the electrode lead 12 is connected to the electrode tab 11 of the electrode assembly 10, and the insulation part 14 is provided on a portion of the electrode lead 12, the electrode assembly 10 may be accommodated in the accommodation space 1331 provided in the lower case 132, and the upper pouch 131 may cover the upper side of the case space 1331. Also, when the electrolyte is injected, and the sealing part formed on the edge of each of the upper case 131 and the lower case 132 is sealed, the secondary battery 1 is manufactured.

Figure 3:
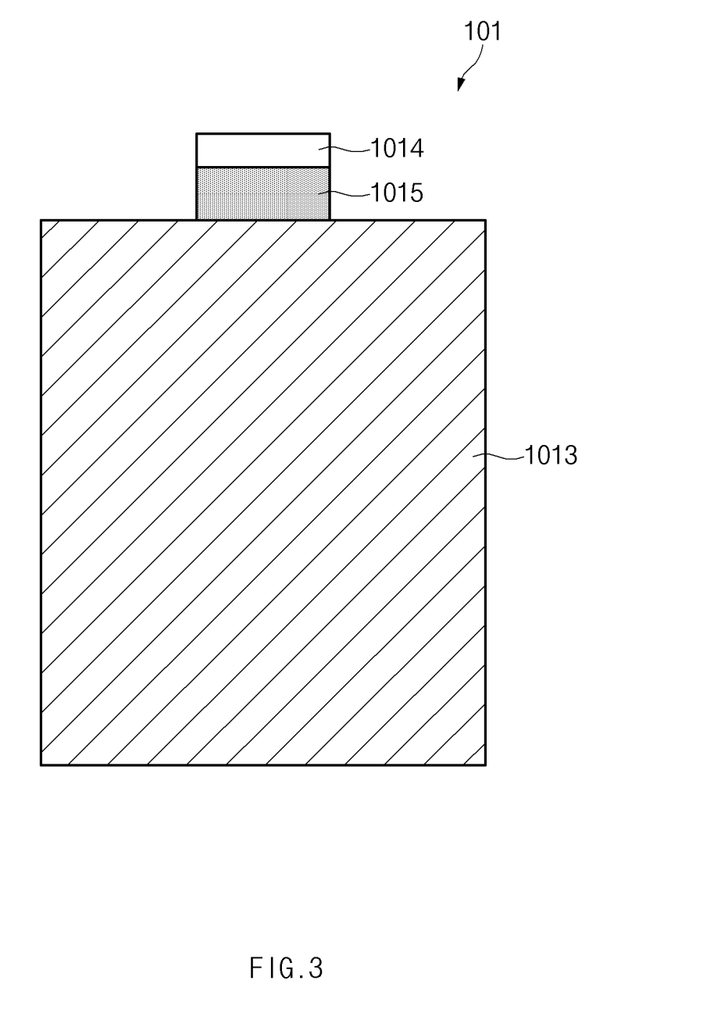
FIG. 3 is a plan view of a cathode according to an embodiment of the present invention.
Figure 4:
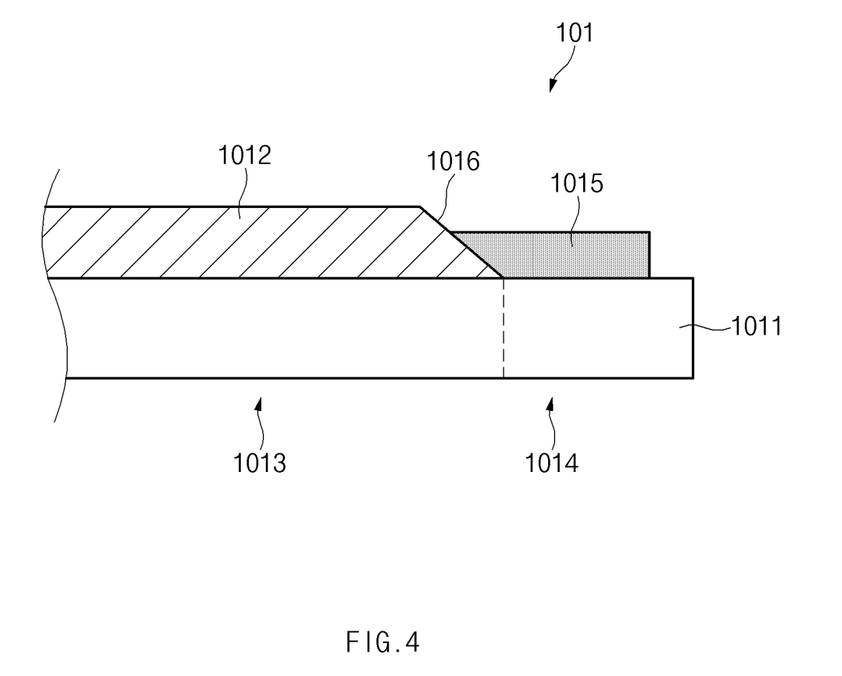
FIG. 4 is a partial enlarged view of a cathode active material coating portion and a cathode active material non-coating portion of the cathode according to an embodiment of the present invention.

FIG. 3 is a plan view of the cathode 101 according to an embodiment of the present invention, and FIG. 4 is a partial enlarged view of the cathode active material coating portion 1013 and the cathode active material non-coating portion 1014 of the cathode 101 according to an embodiment of the present invention.

According to an embodiment of the present invention, since the coating portion 1015 and 1025a containing the flame retardant is coated between the active material coating portions 1013 and 1023 and the active material non-coating portions 1014 and 1024 of the electrodes 101 and 102, even though the cathode 101 and the anode 102 directly contact each other, the initial heat generation may be suppressed to secure safety.

Accordingly, the electrodes 101 and 102 according to an embodiment of the present invention includes: the active material coating portions 1013 and 1023 coated with the electrode active materials 1012 and 1022 on at least one surface of the electrode collectors 1011 and 1021; the active material non-coating portions 1014 and 1024 formed on sides of the active material coating portions 1013 and 1023 and are not coated with the electrode active materials 1012 and 1022; and a coating portion 1015 and 1025a coated between the active material coating portions 1013 and 1023 and the active material non-coating portions 1014 and 1024 and containing the flame retardant.

Also, the electrode assembly according to an embodiment of the present invention includes the cathode 101 including a cathode active material coating portion 1013 coated with the cathode active material 1012 on at least one surface of the cathode collector 1011, a cathode active material non-coating portion 1014 which is formed on one side of the cathode active material coating portion 1013 and is not coated with the cathode active material 1012, and a cathode coating portion 1015 coated between the cathode active material coating portion 1013 and the cathode active material non-coating portion 1014 and containing the flame retardant; the anode 102 including an anode active material coating portion 1023 coated with the anode active material 1022 on at least one surface of the anode collector 1021, an anode active material non-coating portion 1024 which is formed on one side of the anode active material coating portion 1023 and is not coated with the anode active material 1022; and the separator disposed between the cathode 101 and the anode 102.

In the cathode 101 of the plurality of electrodes 101 and 102 provided in the electrode assembly 10, the cathode active material coating portion 1013 is a portion that is coated with the cathode active material 1012 on at least one surface of the cathode collector 1011. As illustrated in FIG. 3, the cathode active material coating portion 1013 is a portion on which the cathode active material 1012 is applied to the cathode collector 1011. Here, as described above, the conductive agent and the binder may be mixed with the cathode active material 1012.

The cathode active material non-coating portion 1014 is a portion which is formed on one side of the cathode active material coating portion 1013 in the cathode 101 and is not coated with the cathode active material 1012. As described above, the cathode tab 111 may be formed by cutting the cathode active material non-coating portion 1014 or by connecting a separate conductive member. Since the cathode active material non-coating portion 1014 is formed on the one side of the cathode active material coating portion 1013, as illustrated in FIG. 4, the cathode active material non-coating portion 1014 may be formed on the same surface of the cathode collector 1011.

While the secondary battery 1 is actually used, an accident due to collision with the outside may occur. For example, a sharp object may pass through the secondary battery 1, and thus, the cathode 101 and the anode 102 may directly contact each other to cause the short circuit. Due to the short circuit, a large amount of gas may be generated at a high speed in a short time, and a high temperature rise may occur. Furthermore, large explosion may occur to lead to a major accident. In general, the contact between the cathode 101 and the anode 102 may include four cases such as a case in which the cathode collector 1011 and the anode collector 1021 contact each other, a case in which the cathode collector 1011 and the anode active material 1022 contact each other, a case in which the cathode active material 1012 and the anode collector 1021 contact each other, and a case in which the cathode active material 1012 and the anode active material 1022 contact each other.

Among them, generally, when the cathode collector 1011 and the anode active material 1022 contact each other, an amount of generated heat is the highest to quickly reach the highest temperature, thereby maximally increasing in risk of explosion. Thus, the contact between the cathode collector 1011 and the anode active material 1022 is known as the most dangerous contact. Thus, according to an embodiment of the present invention, the cathode 101 includes the cathode coating portion 1015 coated between the cathode active material coating portion 1013 and the cathode active material non-coating portion 1014 and containing the flame retardant.

The flame retardant is a material that inhibits combustion reaction and may include various flame retardants such as halogen-based flame retardants, phosphorus-based flame retardants, or inorganic compound flame retardants.

The halogen-based flame retardants generally exhibit a flame retardant effect by substantially stabilizing radicals occurring in a gas phase. The halogen-based flame retardants include, for example, tribromo phenoxyethane, tetra bromo bisphenol-A (TBBA), octabromo diphenyl ether (OBDPE), brominated epoxy oligomers, brominated polycarbonate oligomers, chlorinated paraffins, chlorinated polyethylene, alicyclic group chlorine-based flame retardants, and the like.

The phosphorus-based flame retardants generally produce polymethic acid by pyrolysis to form a protection layer or blocks oxygen by using a carbon film produced by dehydration when polymethic acid is produced to exert the flame retardant effect. The flame retardants include, for example, phosphates such as red phosphorous, ammonium phosphate, and the like, phosphine oxide, phosphine oxide diols, phosphites, phosphonates, triaryl phosphate, alkyldiaryl phosphate, trialkyl phosphate, resorcinaol bisdiphenyl phosphate (RDP), and the like.

The inorganic compound flame retardants are generally decomposed by heat to release water, carbon dioxide, sulfur dioxide, and incombustible gases such as hydrogen chloride and the like, thereby causing an endothermic reaction. As a result, the combustible gases may be diluted to prevent access of oxygen, and the inorganic compound flame retardants are cooled to reduce the production of the product to exert a flame retardant effect. The inorganic compound flame retardants include, for example, aluminum hydroxide $(Al(OH)_3)$, magnesium hydroxide $(Mg(OH)_2)$, boric acid $(BH_3O_3)$, antimony oxide, tin hydroxide, tin oxide, molybdenum oxide, zirconium compound, borate, calcium salts, and the like.

Particularly, an inorganic compound flame retardant among the said flame retardants may be preferably used. According to an embodiment of the present invention, the flame retardant is contained in the cathode coating part 1015. Particularly, flame retardant may preferably include aluminum hydroxide $(Al(OH)_3)$, magnesium hydroxide $(Mg(OH)_2)$, or boric acid $(BH_3O_3)$ that is an inorganic compound flame retardant. In some cases, other additives that induce a flame retardant synergistic effect when used to be mixed with the above-described flame retardant may be further provided.

The cathode coating portion 1015 may be coated between the cathode active material coating portion 1013 and the cathode active material non-coating portion 1014 to suppress the initial heat generation even when the cathode collector 1011 and the anode active material 1022 directly contact with each other, thereby securing the safety.

In particular, as illustrated in FIG. 4, it is preferable that the cathode coating portion 1015 is coated to provide an interface 1016 between the cathode active material coating portion 1013 and the cathode active material non-coating portion 1014. That is, when the cathode active material 1012 is first applied to the cathode active material coating portion 1013, one end of the cathode active material 1012 has the interface 1016 between the cathode active material coating portion 1013 and the cathode active material non-coating portion 1014. Then, the cathode coating portion 1015 may be coated while partially covering the one end of the applied cathode active material 1012. Therefore, even if the cathode coating portion 1015 is delaminated to some extent, the cathode collector 1011 of the cathode active material non-coating portion 1014 may not be significantly exposed. As a result, the cathode collector 1011 and the anode active material 1022 may be prevented from contacting each other through the partially delaminated area of the cathode coating portion 1015.

Figure 5:
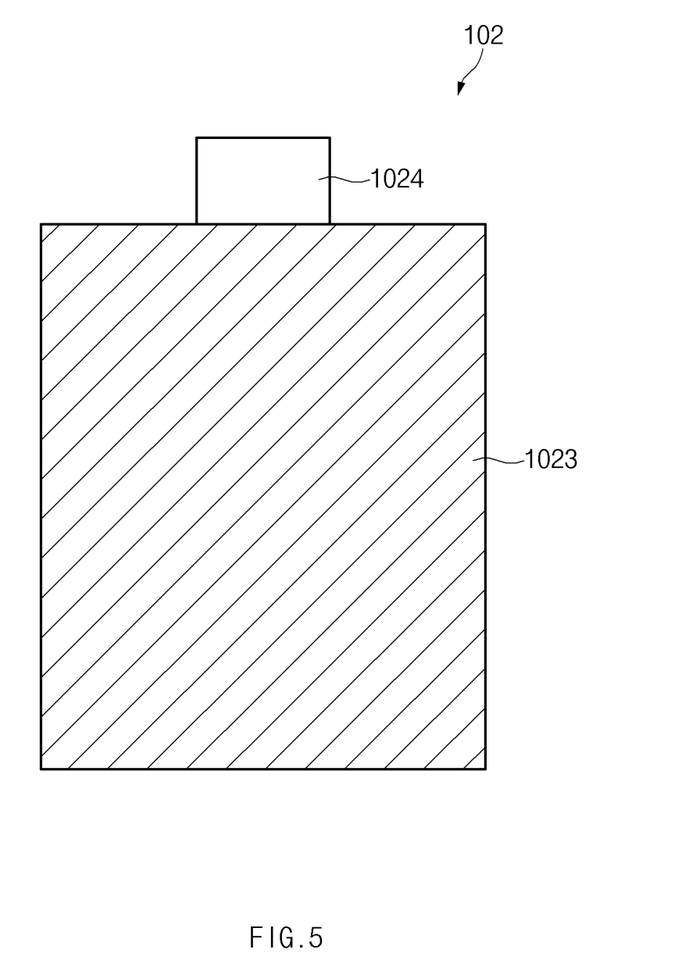
FIG. 5 is a plan view of an anode according to an embodiment of the present invention.
Figure 6:
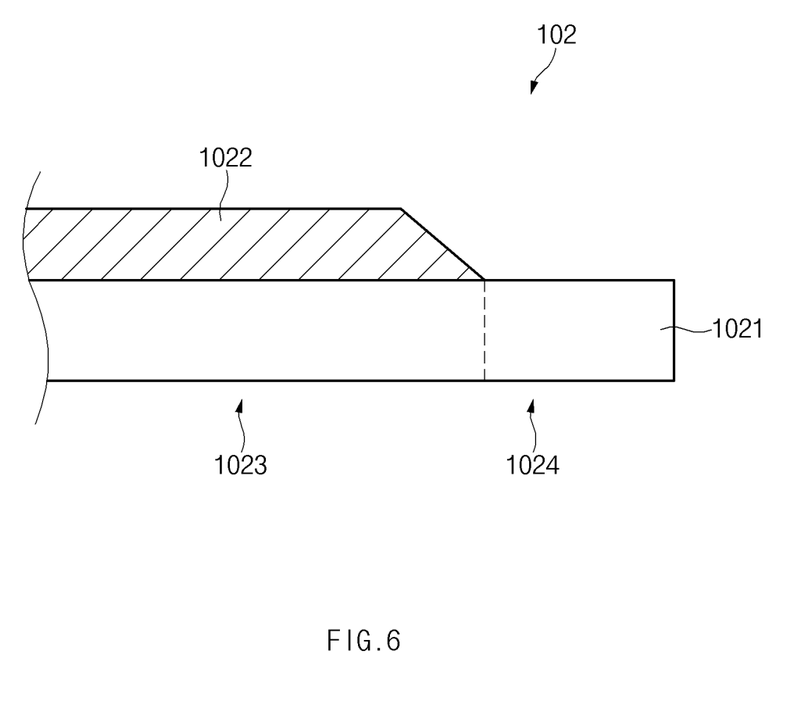
FIG. 6 is a partial enlarged view of an anode active material coating portion and an anode active material non-coating portion of the anode according to an embodiment of the present invention.

FIG. 5 is a plan view of the anode 102 according to an embodiment of the present invention, and FIG. 6 is a partial enlarged view of the anode active material coating portion 1023 and the anode active material non-coating portion 1024 of the anode 102 according to an embodiment of the present invention.

According to an embodiment of the present invention, in the anode 102 of the plurality of electrodes 101 and 102 provided in the electrode assembly 10, the anode active material coating portion 1023 is a portion that is coated with the anode active material 1022 on at least one surface of the anode collector 1021. As shown in FIG. 5, the anode active material coating portion 1023 is a portion on which the anode active material 1022 is applied to the anode collector 1021. Here, as described above, the conductive agent, the binder, and the filler may be optionally mixed with the anode active material 1022.

The anode active material non-coating portion 1024 is a portion which is formed on one side of the anode active material coating portion 1023 in the anode 102 and is not coated with the anode active material 1022. As described above, the anode tab 112 may be formed by cutting the anode active material non-coating portion 1024 or by connecting a separate conductive member. Since the anode active material non-coating portion 1024 is formed on the one side of the anode active material coating portion 1023, as illustrated in FIG. 6, the anode active material non-coating portion 1024 may be formed on the same surface of the anode collector 1021.

As described above, since the risk of explosion is greatest when the cathode collector 1011 and the anode active material 1022 contact each other, when the anode collector 1021 contacts the cathode collector 1011 or the cathode active material 1012, the risk of explosion is relatively small. Therefore, according to an embodiment of the present invention, the anode 102 does not have the anode coating portion containing the flame retardant.

Figure 7:
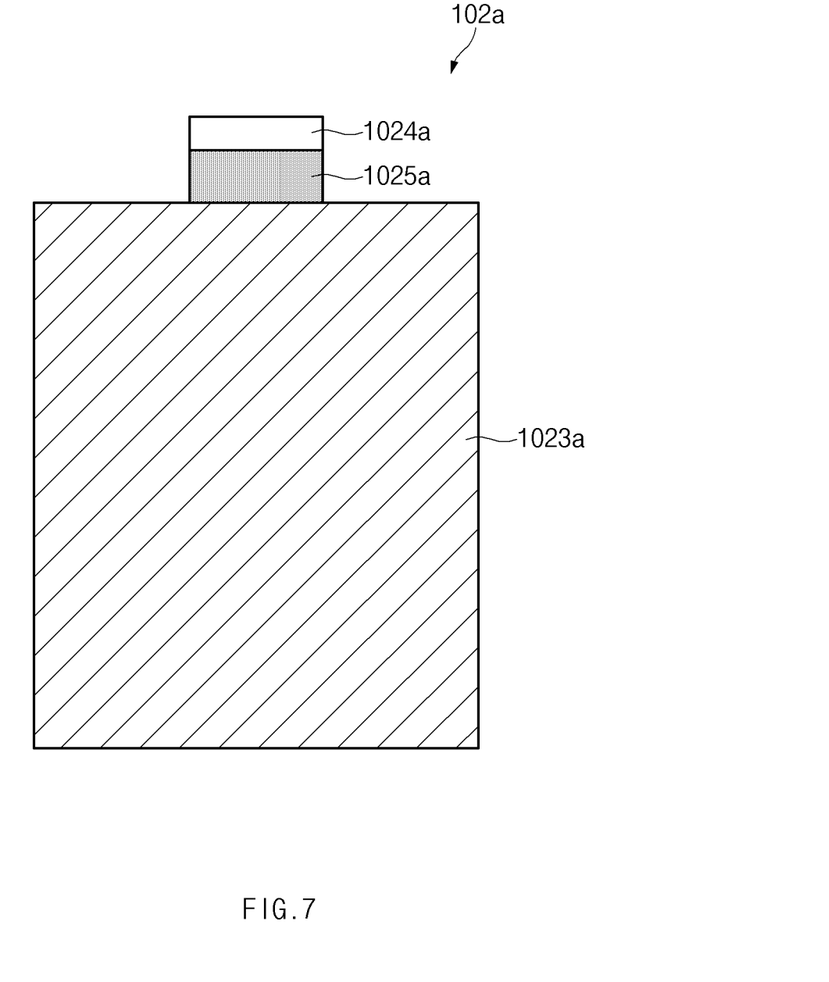
FIG. 7 is a plan view of an anode according to another embodiment of the present invention.
Figure 8:
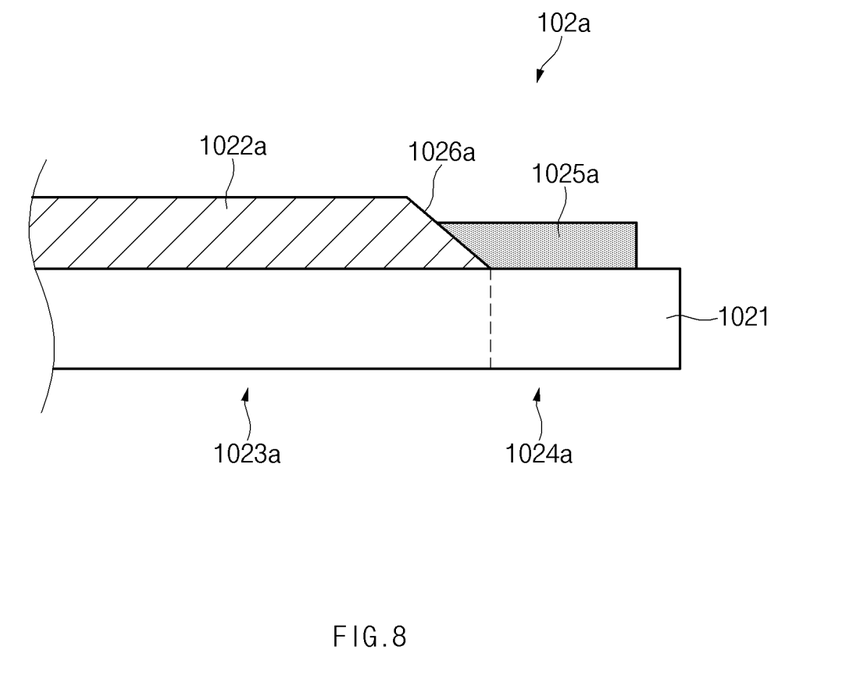
FIG. 8 is a partial enlarged view of an anode active material coating portion and an anode active material non-coating portion of the anode according to another embodiment of the present invention.

FIG. 7 is a plan view of an anode 102a according to another embodiment of the present invention, and FIG. 8 is a partial enlarged view of an anode active material coating portion 1023a and an anode active material non-coating portion 1024a of the anode 102a according to another embodiment of the present invention.

When an anode collector 1021 contacts a cathode collector 1011 or a cathode active material 1012, a risk of explosion is relatively small. However, this is only relative to the case in which the cathode collector 1011 and an anode active material 1022 contact each other, and also, safety is not secured.

Therefore, according to another embodiment of the present invention, as illustrated in FIG. 7, the anode 102a further includes an anode coating portion 1025a that is coated between the anode active material coating portion 1023a and the anode active material non-coating portion 1024a and contains a flame retardant. Thus, even when the anode collector 1021 and the cathode collector 1011 or the cathode active material 1012 directly contact each other, initial heat generation may be suppressed to ensure safety.

In particular, as illustrated in FIG. 8, the anode coating portion 1025a may be coated to provide an interface 1026a between the anode active material coating portion 1023a and the anode active material non-coating portion 1024a. That is, when the anode active material 1022a is first applied to the anode active material coating portion 1023a, one end of the anode active material 1022a has the interface 1026a between the anode active material coating portion 1023a and the anode active material non-coating portion 1024a. Then, the anode coating portion 1025a may be coated while partially covering the one end of the applied anode active material 1022a. Therefore, even if the anode coating portion 1025a is delaminated to some extent, the anode collector 1021 of the anode active material non-coating portion 1024a may not be significantly exposed. As a result, the anode collector 1021 and the cathode collector 1011 or the cathode active material 1012 may be prevented from contacting each other through the partially delaminated area of the anode coating portion 1025a.

Those with ordinary skill in the technical field of the present invention pertains will be understood that the present invention can be carried out in other specific forms without changing the technical idea or essential features. Therefore, the above-disclosed embodiments are to be considered illustrative and not restrictive. Accordingly, the scope of the present invention is defined by the appended claims rather than the foregoing description and the exemplary embodiments described therein. Various modifications made within the meaning of an equivalent of the claims of the invention and within the claims are to be regarded to be in the scope of the present invention.

The invention claimed is:

1. An electrode comprising:
   an active material coating portion coated with an electrode active material on at least one surface of an electrode collector;
   an active material non-coating portion which is formed on one side of the active material coating portion and is not coated with the electrode active material; and
   an electrode coating portion which is coated between the active material coating portion and the active material non-coating portion, in contact with the electrode active material at a terminal region of the active material coating portion, and contains a flame retardant,
   wherein the flame retardant comprises halogen-based flame retardants or phosphorus-based flame retardants
   wherein the electrode coating portion extends away from the terminal region of the active material coating portion, so as to cover only a portion of the active material non-coating portion.

2. The electrode of claim 1, wherein the electrode collector is a cathode collector, and
   the electrode active material is a cathode active material.

3. The electrode of claim 1, wherein the electrode coating portion comprises an interface between the active material coating portion and the active material non-coating portion.

4. The electrode of claim 1, wherein the active material coating portion and the active material non-coating portion are formed on a same surface of the electrode collector.

5. The electrode of claim 1, wherein the flame retardant comprises tribromo phenoxyethane, tetra bromo bisphenol-A (TBBA), octabromo diphenyl ether (OBDPE), brominated epoxy oligomers, brominated polycarbonate oligomers, chlorinated paraffins, chlorinated polyethylene, alicyclic group chlorine-based flame retardants, red phosphorous, ammonium phosphate, phosphine oxide, phosphine oxide diols, phosphites, phosphonates, triaryl phosphate, alkyldiaryl phosphate, trialkyl phosphate, or resorcinaol bisdiphenyl phosphate (RDP).

6. The electrode of claim 1, wherein the electrode collector is formed of a net, a porous body, a foam, or a non-woven fabric, and wherein unevenness is formed on the at least one surface of the electrode collector.

7. An electrode assembly comprising:
   a cathode comprising a cathode active material coating portion coated with a cathode active material on at least one surface of a cathode collector, a cathode active material non-coating portion which is formed on one side of the cathode active material coating portion and is not coated with the cathode active material, and a cathode coating portion which is coated between the cathode active material coating portion and the cathode active material non-coating portion, in contact with the cathode active material at a terminal region of the cathode active material coating portion, and contains a flame retardant, the flame retardant comprising halogen-based flame retardants or phosphorus-based flame retardants;
   an anode comprising an anode active material coating portion coated with an anode active material on at least one surface of an anode collector, an anode active material non-coating portion which is formed on one side of the anode active material coating portion and is not coated with the anode active material; and
   a separator disposed between the cathode and the anode,
   wherein the cathode coating portion extends away from the terminal region of the cathode active material coating portion, so as to cover only a portion of the cathode active material non-coating portion.

8. The electrode assembly of claim 7, wherein the anode further comprises an anode coating portion which is coated between the anode active material coating portion and the anode active material non-coating portion and contains a flame retardant.

9. A secondary battery comprising the electrode assembly of claim 7.

10. The secondary battery of claim 9, further comprising:
a plurality of electrode tabs respectively protruding from the cathode and the anode;
a plurality of electrode leads respectively connected to the plurality of electrode tabs to transfer electricity generated in the electrode assembly to the outside;
a battery case configured to accommodate the electrode assembly therein; and
an insulation part configured to surround the plurality of electrode leads, sealed with the battery case, and containing a flame retardant.

11. An electrode comprising:
an active material coating portion in which at least one surface of an electrode collector is coated with an electrode active material;
an active material non-coating portion which is formed on one side of the active material coating portion and in which the electrode collector is not coated with the electrode active material; and
an electrode coating portion coated on the at least one surface of the electrode collector and in contact with the electrode active material at a terminal region of the active material coating portion, and containing a flame retardant,
wherein the flame retardant comprises halogen-based flame retardants or phosphorus-based flame retardants,
wherein the electrode coating portion extends away from the terminal region of the active material coating portion, so as to cover only a portion of the active material non-coating portion.

12. The electrode of claim 11, wherein the electrode collector is a cathode collector, and
the electrode active material is a cathode active material.

13. The electrode of claim 11, wherein the electrode coating portion comprises an interface between the active material coating portion and the active material non-coating portion.

14. The electrode of claim 11, wherein the electrode active material and the electrode coating portion are formed on a same surface of the electrode collector.

15. An electrode assembly comprising:
the electrode of claim 11 as a cathode;
an anode comprising an anode active material coating portion in which at least one surface of an anode collector is coated with an anode active material, an anode active material non-coating portion which is formed on one side of the anode active material coating portion and in which the anode collector is not coated with the anode active material; and
a separator disposed between the cathode and the anode.

16. The electrode assembly of claim 15, wherein the anode further comprises an anode coating portion coated on the at least one surface of the anode collector and in contact with the anode active material, and containing a flame retardant.

17. A secondary battery comprising the electrode assembly of claim 15.

18. The secondary battery of claim 17, further comprising:
a plurality of electrode tabs respectively protruding from the cathode and the anode;
a plurality of electrode leads respectively connected to the plurality of electrode tabs to transfer electricity generated in the electrode assembly to the outside;
a battery case configured to accommodate the electrode assembly therein; and
an insulation part configured to surround the plurality of electrode leads, sealed with the battery case, and containing a flame retardant.

19. The electrode of claim 11, wherein the flame retardant comprises tribromo phenoxyethane, tetra bromo bisphenol-A (TBBA), octabromo diphenyl ether (OBDPE), brominated epoxy oligomers, brominated polycarbonate oligomers, chlorinated paraffins, chlorinated polyethylene, alicyclic group chlorine-based flame retardants, red phosphorous, ammonium phosphate, phosphine oxide, phosphine oxide diols, phosphites, phosphonates, triaryl phosphate, alkyldiaryl phosphate, trialkyl phosphate, or resorcinaol bisdiphenyl phosphate (RDP).

20. The electrode of claim 11, wherein the electrode collector is formed of a net, a porous body, a foam, or a non-woven fabric, and wherein unevenness is formed on the at least one surface of the electrode collector.

* * * * *